April 7, 1931.  F. PUENING  1,799,702

HEATING APPARATUS

Filed Oct. 26, 1928   6 Sheets-Sheet 1

INVENTOR.
Franz Puening.
BY Jesse R. Langley
ATTORNEY

April 7, 1931.  F. PUENING  1,799,702
HEATING APPARATUS
Filed Oct. 26, 1928  6 Sheets-Sheet 2

INVENTOR.
Franz Puening
BY
Jesse P. Langley
ATTORNEY.

April 7, 1931.   F. PUENING   1,799,702
HEATING APPARATUS
Filed Oct. 26, 1928   6 Sheets-Sheet 5

INVENTOR.
Franz Puening
BY
Jesse R. Langley
ATTORNEY.

Patented Apr. 7, 1931

1,799,702

UNITED STATES PATENT OFFICE

FRANZ PUENING, OF O'HARA TOWNSHIP, ALLEGHENY COUNTY, PENNSYLVANIA

HEATING APPARATUS

Application filed October 26, 1928. Serial No. 315,271.

My invention relates to heating apparatus and particularly to such apparatus as furnaces, chambers, retorts, leers and other structures in which it is desired to maintain throughout the heating chamber a substantially uniform temperature that is below the temperature of combustion of ordinary fuels.

One of the objects of my invention is to provide a system of heating in which currents of hot gases may be reciprocated through a chamber to be heated by simple and reliable means for effecting the reversal of the gases.

A further object of my invention is to provide simple and effective reversing mechanism for heating gases that shall be capable of reversing large quantities thereof without the necessity for providing reversing mechanism of undue size or cost.

The heating system of the present invention is similar in its general aspects to that shown and described in my Patent No. 1,542,956, granted June 23, 1925. In the patented construction, a piston that is provided with special cooling means operates to actuate the heating gases through the space to be heated in directions that correspond to the direction of the piston. While this mechanism is capable of satisfactorily performing the work for which it is designed, the pistons and the chambers within which they operate occupy considerable space when large bodies of gases are reciprocated and considerable care must be taken in their mechanical construction when the temperature of the gases to be controlled thereby is relatively high.

In accordance with the present invention, I provide a system in which gases are periodically reversed in their direction of flow to the space or materials to be heated. The actuating mechanism comprises a fan which operates continuously in the same direction. The direction of the gases is, however, controlled by a reversing mechanism that is operated periodically by mechanism connected to the fan to change the direction of the gases. The reversing mechanism comprises two dampers that respectively control passageways of a 2-way system. The positions of the dampers automatically determine the direction of flow of the gases while the direction of the fan or impelling device remains the same.

The details of my invention will be described in connection with the accompanying drawings, in which Figure 1 is a view in longitudinal vertical section, taken on line I—I of Fig. 2;

Figure 1:
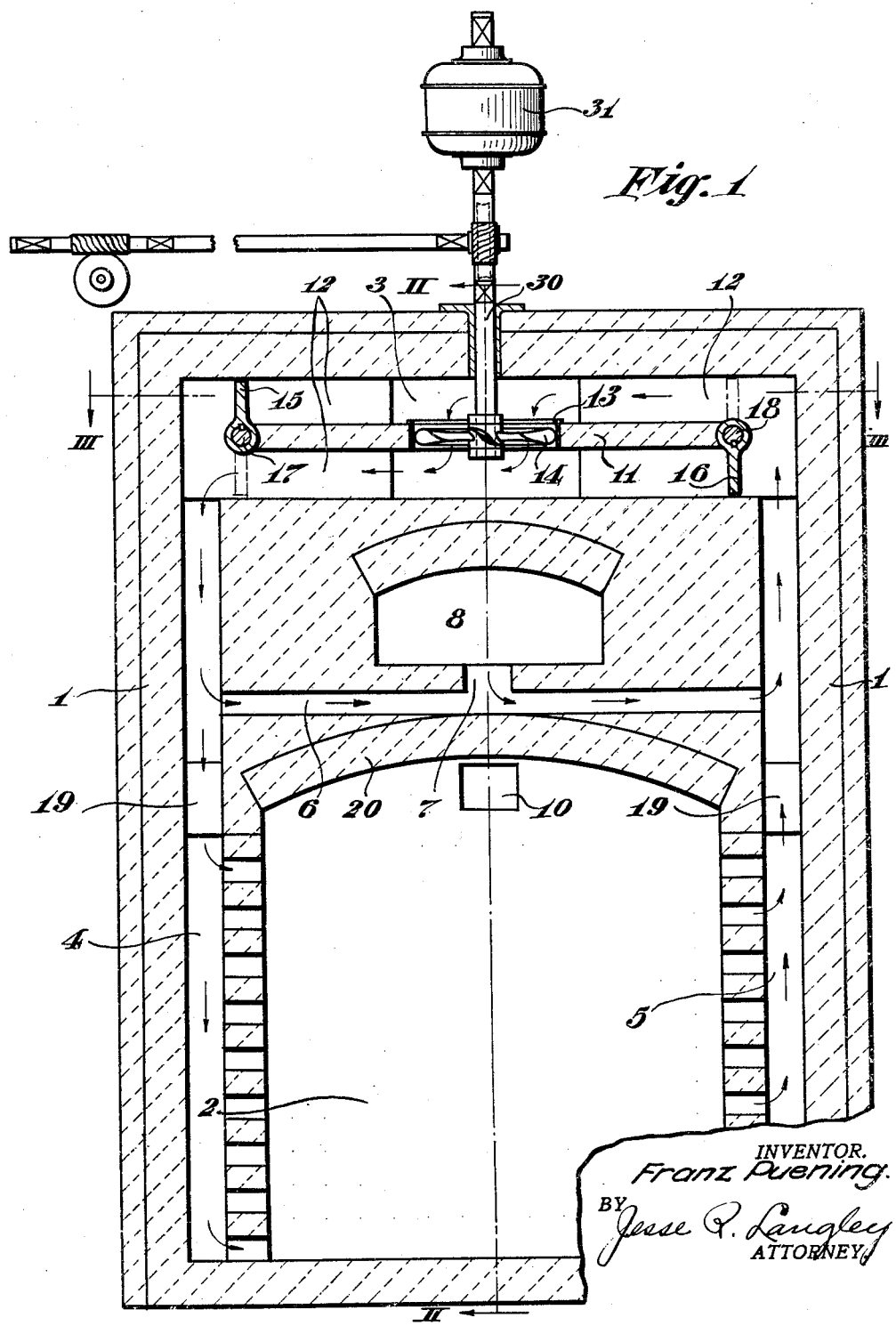
Figure 2:
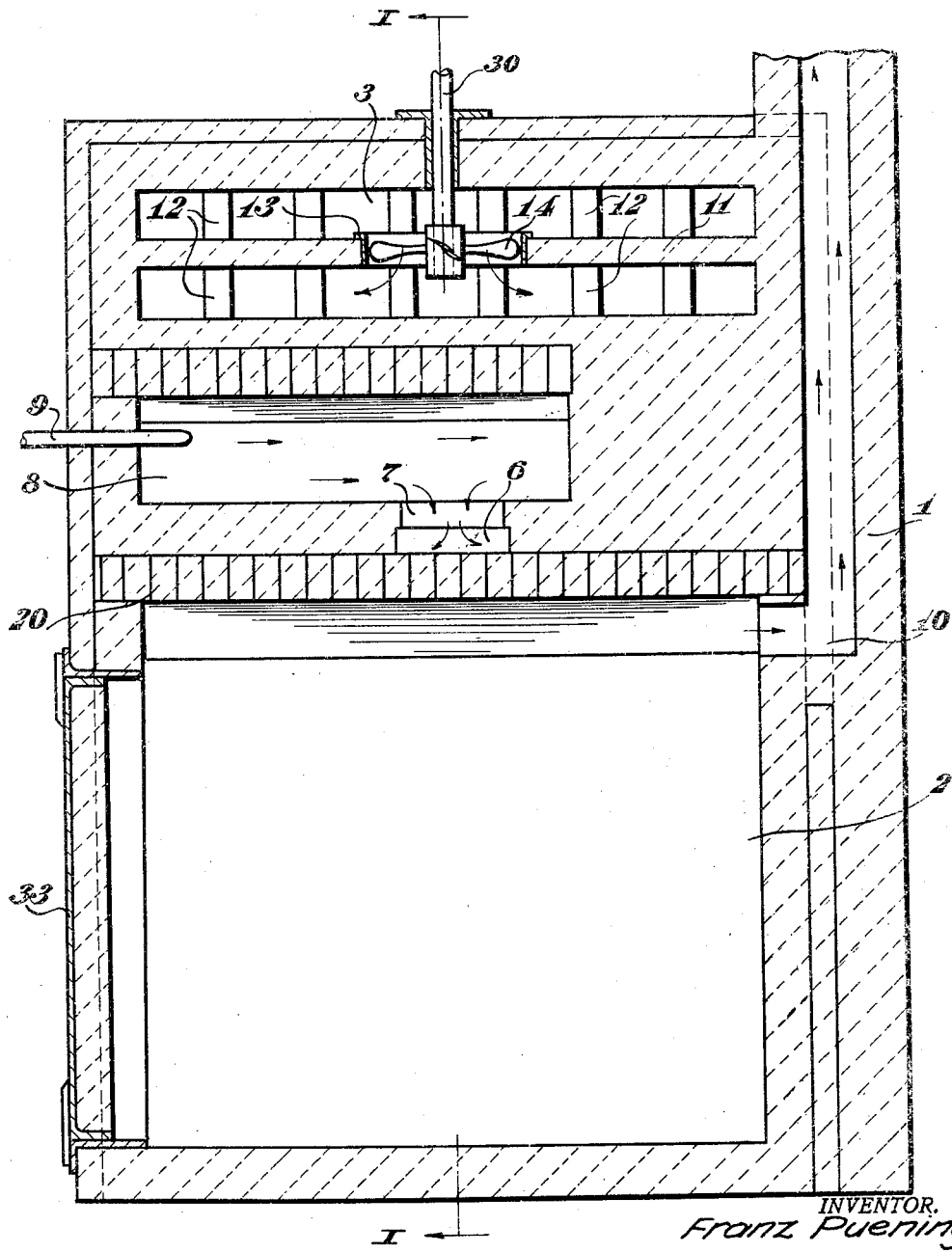
Fig. 2 is a similar view, taken at right angles thereto, on line II—II of Fig. 1.
Figure 3:
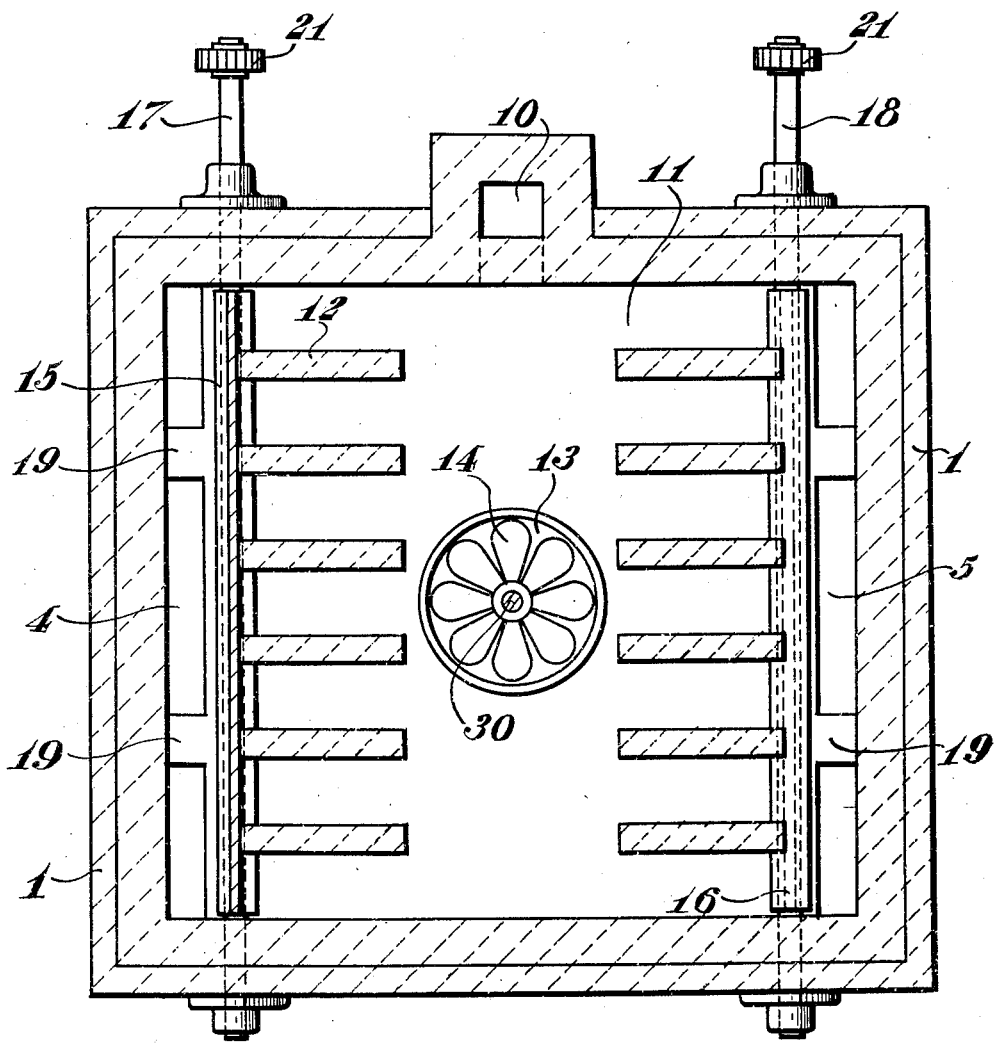
Fig. 3 is a view in transverse horizontal section taken on line III—III of Fig. 1.

Referring particularly to Figs. 1 to 5, a heating system constructed in accordance with my invention embodies suitable outer walls 1 which may be of refractory or heat-insulating material that enclose a chamber 2 to be heated, a 2-way mixing and reversing chamber 3 and vertical flues 4 and 5 for connecting opposite sides of the chambers 2 and 3.

The flues 4 and 5 are connected by a horizontal by-pass channel 6 that is, in turn, connected by a duct 7 to a chamber 8 extending transversely of the duct and adjacent to the mixing and reversing chamber 3. The chamber 8 is provided with a gas burner 9, by means of which the chamber 8 may be provided with gases of combustion at a relatively high temperature. It will be understood, of course, that the chamber 8 may be supplied with hot gases from any other suitable source, which may or may not be located within the walls 1. The hot gases are supplied through the duct 7 from the chamber 8 to the central portion of the by-pass channel 6.

The inner end of the heating chamber 2 is provided with an outlet duct 10, through which certain of the gases employed for heating may escape. The exhaust gases may be employed in any suitable manner, such, for example, as heating a waste heat boiler or other recuperative device.

The reversing chamber 3 comprises two substantially parallel passageways that are separated by a horizontal partition 11. The partition 11 is spaced from the top and bottom walls of the reversing chamber 3 by vertical walls 12 that are spaced at convenient intervals.

The spacing walls 12 are disposed in pairs at the ends of the partition wall 11 and extend approximately a third of the length of the latter, leaving an open space on each side of the partition wall 11 throughout its central portion. The partition 11 is provided with a central circular opening 13, within which is mounted a fan 14 for actuating the gases.

The passageways constituted by the spaces respectively above and below the partition walls 11 are controlled by two dampers 15 and 16, which extend in opposite directions from the respective ends of the partition wall 11. The dampers are respectively mounted on shafts 17 and 18, by means of which they are brought to the one or the other of their operative positions.

Each of the flues 4 and 5 is provided with supporting blocks 19 that are opposite the ends of the arch 20 for supporting the roof of the heating chamber. The supporting blocks 19 are sufficiently spaced that they do not materially obstruct the flow of gases through the flues 4 and 5.

Figure 4:
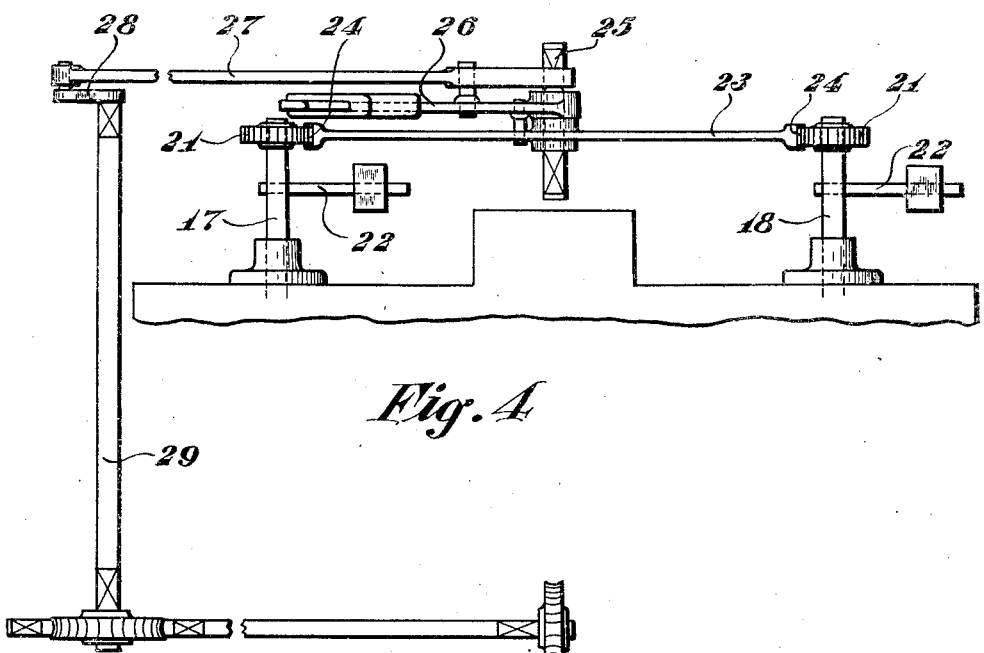
Fig. 4 is a top plan view of the reversing mechanism for the dampers and certain of the associated apparatus.
Figure 5:
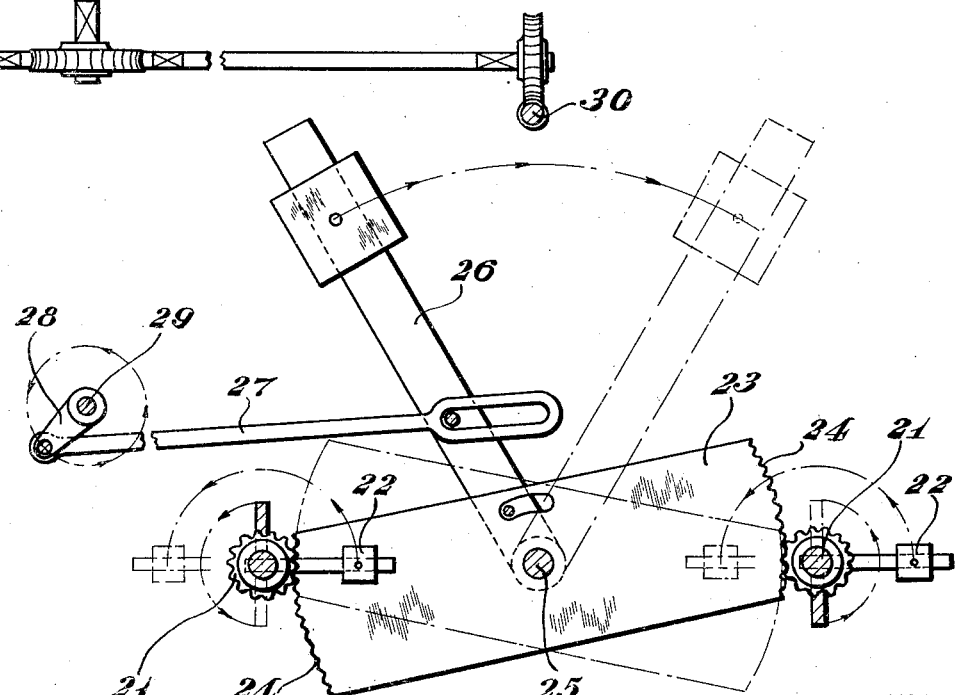
Fig. 5 is a side elevational view of a portion of the reversing mechanism.

Reference may now be had to Figs. 4 and 5, in which the reversing mechanism for the dampers 15 and 16 is illustrated in detail. Each of the horizontally extending shafts 17 and 18 of the dampers is provided at its outer end with a pinion 21 and a weighted arm 22. The pinions 21 are connected by means of a lever 23 having, at each end thereof, a segmental gear 24. The lever 23 is mounted for pivotal movement on a shaft 25, upon which is also mounted a weighted arm 26 that has a pin-and-slot connection to the lever 23.

The position of the arm 26 is controlled by means of a link 27 having a pin-and-slot connection thereto and a crank arm 28 carried by a shaft 29, having a worm-gear connection to the shaft 30 of the fan 14. The shaft 30 and its connected mechanism is driven by a motor 31, which may be, for example, an electric motor.

The operation of the heating system shown in Figs. 1 to 5 will now be described. It may be assumed that the enclosure 2 or heating chamber is occupied by devices or material to be heated and which have been inserted through a removable door 33. It may be assumed, also, that the spaces within the walls 1 are filled with hot gases that have been supplied thereto from the combustion chambers 8. It may be assumed, further, that the fan 14 is rotating and that the dampers 15 and 16 occupy their respective illustrated positions. The directions of the various currents of gases through the heating system are represented by arrows.

Hot gases of combustion at a relatively high temperature are being supplied from the combustion chamber 8 through the duct 7 into the by-pass channel 6. The hot gases flow in the direction of the arrows, together with the gases traversing the by-pass channel and a portion of the heat of the newly added gases is transferred to adjacent older gases, although complete equalization of temperatures is not probable under such circumstances. The gases of various temperatures, including the newly added gases, the gases traversing the by-pass channel 6 and the cooler returning from the heating chamber 2, are received in the upper passageway of the mixing and reversing chamber from which they are supplied to the fan 14.

The gases of various temperatures are thoroughly mixed by the fan 14 and they flow through the lower passageway to the flue 4 into the heating chamber 2. This operation continues for a desired period with the various parts in the position shown and described.

When the operation has continued for a period that is determined by the speed of the motor 31 and the gear ratio between the shafts 30 and 29, the crank 28 and the link 27 have actuated the weighted arm 26 to the right, as viewed in Fig. 5, until it is slightly beyond the vertical line, whereupon it rocks to its dotted-line position, this action being permitted by the pin-and-slot connection to the link 27. During the latter portion of the movement of the arm 26, the lever 23 is actuated from the full-line position (Fig. 5) to its dotted-line position by reason of the pin-and-slot connection to the arm 26. The rocking movement of the lever 23 causes the pinions 21 and the connected shafts 17 and 18 to turn the dampers 15 and 16 in opposite directions from their illustrated positions to positions 180° from them and indicated by dotted lines (Fig. 1). The weighted arms 22 that are connected to the shafts of the dampers actuate the latter to their closed position and operate to firmly maintain the dampers in those positions.

The operating conditions are now reversed and the gases flow in directions opposite to the arrows, the flue 5 now supplying hot gases to the enclosure 2 and the flue 4 returning the gases of various temperatures through the upper passageway to the fan for mixture and actuation in the manner previously described except that the directions are reversed.

At the end of a predetermined period, the dampers are again reversed. The arm 26 and the connected mechanism including the lever 23 are actuated in the opposite directions to restore the operating conditions to those previously described.

During the operation of the system in either of the directions of flow of gases through the heating chamber 2, hot gases are constantly added to the quantity being recirculated from the combustion chamber 8. The duct 6 is located at a central or neutral point of the by-pass channel 6 and, accordingly, the pressure differential with respect to the system is unchanged between the by-pass channel 6 and the duct 7 with reversals of the gases. Similarly, the outlet duct 10 is at a neutral point since it is symmetrically located with respect to the circulating system and cool gases flow outwardly through the duct 10 with the same pressure differential in either direction of flow of gases within the system.

Figure 6:
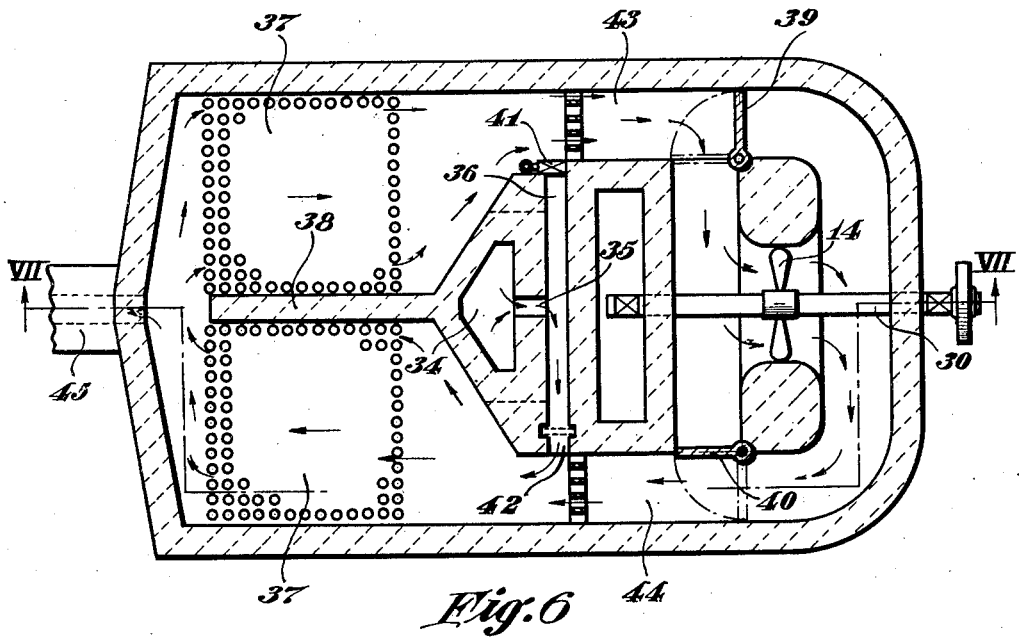
Fig. 6 is a view in longitudinal horizontal section taken on line VI—VI of Fig. 7 of a modification of my invention.
Figure 7:
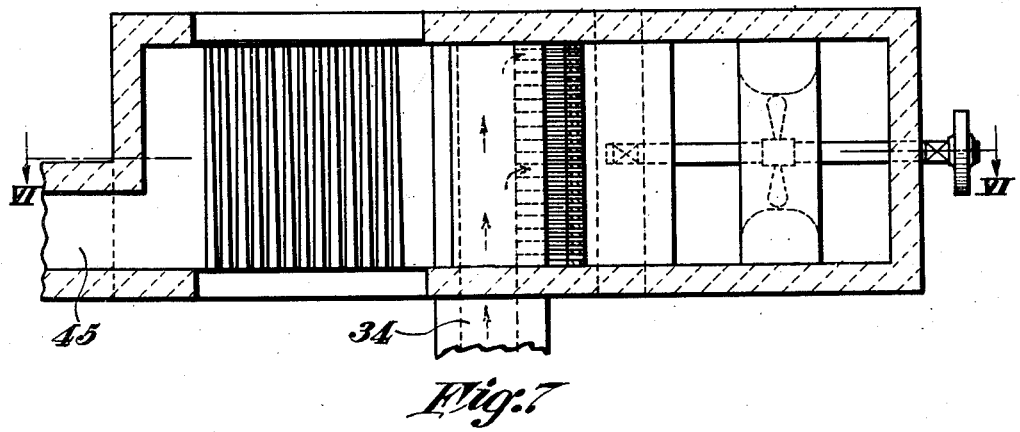
Fig. 7 is a vertical sectional view taken on line VII—VII of Fig. 6.

In the modification shown in Figs. 6 and 7, the structure and method of operation are similar in a general way to those of the heating system described hereinabove. In the present arrangement, however, hot gases are supplied through a duct 34 from any source outside the enclosure, which source may be, for example, a furnace or similar device. The hot gases are supplied from duct 34 through a central duct 35 to a by-pass channel 36.

The heating chamber 37 is divided by a partition 38, which extends the greater portion of the length of the heating chamber, an opening being provided at one end of the partition for the passage of gases from one half of the heating chamber to the other. The fan 14 that is provided for actuating the gases as in the previous form of my invention, is mounted for rotation in the direction opposite to that of the former arrangement for receiving gases through an inner passageway and actuating them through an outer passageway to the heating chamber. The ends of the inner and the outer passageways are respectively controlled by swinging dampers 39 and 40 for reversing the direction of flow of gases, as will be readily understood. The reversing mechanism for the dampers, which is not illustrated in these views, may be similar, in all respects, to that described in connection with Figs. 1 to 5.

The by-pass channel 36 is provided, at its respective ends with sliding dampers 41 and 42 that are arranged to open one end of the by-pass channel while the other end is closed. For this purpose, the dampers 41 and 42 may be connected by any simple and well-known means (not shown) to operate simultaneously with the dampers 39 and 40.

The operation of the modified heating system comprises the actuation of the relatively cool gases that have been returned from the heating chamber, for example, through the horizontal duct 43. These gases pass to the left, as viewed in Fig. 6, through a horizontal duct 44, and pass the open end of the by-pass channel 36, where hot gases are added.

The combined gases, which have a temperature below that of the added gases, circulate through both sides of the heating chamber 37 and return through the horizontal duct 43 to the fan. In view of the fact that the sliding damper 41 is closed when the various parts are in the position shown in Fig. 6, no hot gases from the by-pass channel 36 flow into the stream of returning cool gases and, accordingly, the fan is in contact only with the relatively cool gases.

When the dampers 39 and 40 are swung from their full-line positions to the positions indicated by dotted lines (Fig. 6) and the sliding dampers 41 and 42 are operated to respectively open and close the ends of the by-pass channel 36, the course of the gases through the heating system is reversed and the same conditions apply since the system is symmetrical.

As in the previous construction, the duct 35 and an outlet duct 45 are located at neutral points with respect to the pressure differential of the circulating system and the inflow of hot gases and the outflow of relatively cool gases occur substantially continuously and under similar conditions in the respective directions of flow in the system.

Figure 8:
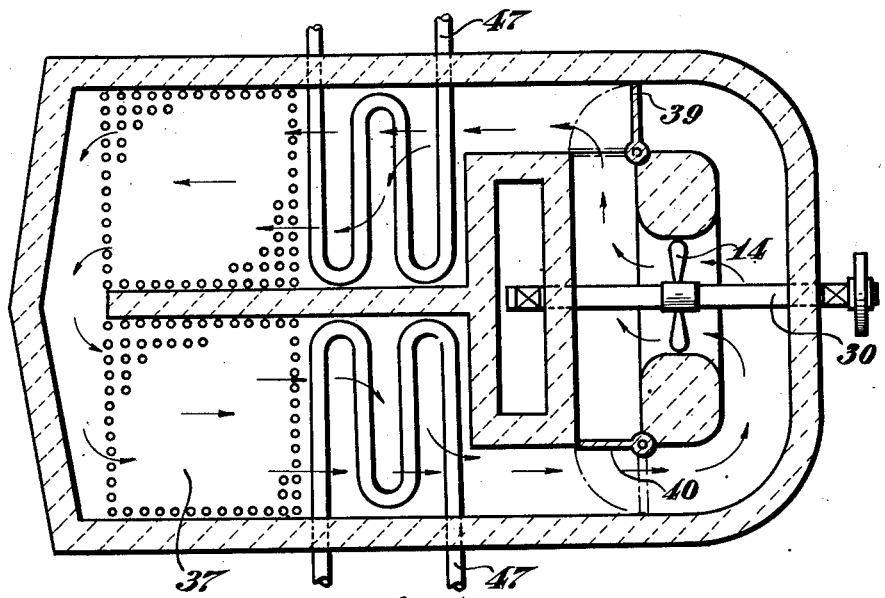
Figs. 8 and 9 are horizontal sectional views of modifications.

In the modification shown in Fig. 8, the gases circulated through the heating chamber are heated by two muffles 47 through the hollow pipes of which are circulated hot gases from any suitable outside source. In this arrangement, it is not necessary to provide inlet and outlet ducts for the gases being circulated as no replacement is required. The fan and dampers operate as in the system of Figs. 1 to 5.

Figure 9:
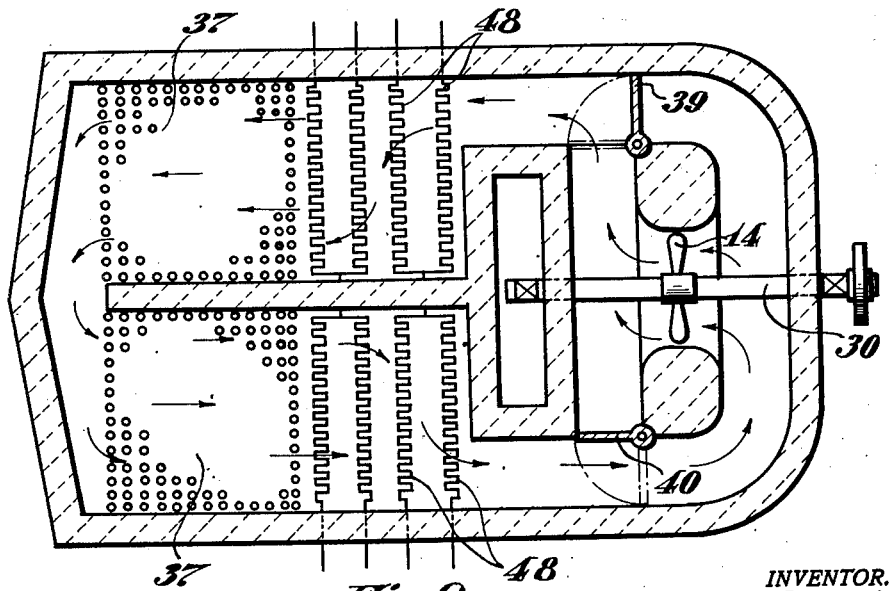

The system of Fig. 9 differs from that of Fig. 8 only in electrical heating elements 48 being substituted for the muffles 47.

The heating systems constituting my invention possess the advantage that the fan or impelling means may be uni-directional and the gases may be reversed in the circulating system without the necessity for stopping or changing the direction of the fan. The operation of the dampers is accomplished by simple mechanisms connected to the fan shaft and little power is required to effect their change in positions.

The materials or devices to be heated are subjected to a uniform temperature since the gases are distributed throughout the heating chamber and the circulation is reversed periodically whereby substantially all of the material to be heated arrives at the desired temperature simultaneously.

In the modified construction, a further advantage is obtained in that the fan is not subjected to the hot gases that are added since only the relatively cool gases are returned to the fan for recirculation.

The foregoing and other advantages will be apparent to those skilled in the art relating to heating systems.

I claim as my invention:

1. Heating apparatus comprising an enclosure to be heated and means for reciprocating hot gases through said enclosure, said means comprising a fan, dampers for controlling the direction of the gases impelled by said fan and means for periodically reversing said dampers.

2. Heating apparatus comprising an enclosure to be heated, a power-driven fan for impelling hot gases through said enclosure, dampers for regulating the reciprocation of said gases and means operatively connected to said fan for periodically reversing said dampers.

3. Heating apparatus comprising an enclosure to be heated, means for reciprocating hot gases through said enclosure, said means comprising a unidirectional impelling device and dampers for selectively controlling the direction of said gases, and means for periodically reversing said dampers to correspondingly reverse the flow of said gases.

4. Heating apparatus comprising an enclosure to be heated, means for reciprocating hot gases through said enclosure, said means comprising a unidirectional impelling device and dampers for selectively controlling the direction of said gases, and reversing mechanism connected to said impelling device for controlling said dampers to periodically reverse the flow of said gases.

5. Heating apparatus comprising an enclosure to be heated, means for reciprocating hot gases through said enclosure, said means comprising a unidirectional impelling device and dampers for selectively controlling the direction of said gases, and reversing mechanism for said dampers comprising an oscillatable member having a lost-motion connection to said dampers.

6. Heating apparatus comprising an enclosure to be heated, means for reciprocating hot gases through said enclosure, said means comprising a unidirectional impelling device and dampers for selectively controlling the direction of said gases, and reversing mechanism for said dampers comprising a periodically movable member and means for biasing said member and said dampers to the one or the other of their operative positions.

7. Heating apparatus comprising an enclosure to be heated, means for reciprocating hot gases through said enclosure, said means comprising a unidirectional impelling device and dampers for selectively controlling the direction of said gases, and reversing mechanism for said dampers comprising a member connected thereto and having a lost-motion connection to said impelling device, and means for biasing the dampers to their respective operative positions.

8. Heating apparatus comprising an enclosure to be heated, a chamber, flues for connecting said chamber to said enclosure at opposite sides thereof to provide a path for the circulation of gases through said enclosure, an outlet for a portion of the gases in said path, a by-pass channel for connecting opposite sides of said path, a second channel adapted to supply hot gases to said by-pass channel, and a fan in said chamber for actuating through said path the gases returned from said enclosure and the gases from said by-pass channel including the hot gases supplied thereto.

9. Heating apparatus comprising an enclosure to be heated, a chamber, flues for connecting said chamber to said enclosure at opposite sides thereof to provide a path for the circulation of gases through said enclosure, an outlet for a portion of the gases in said path, a by-pass channel for connecting opposite sides of said path, a second channel adapted to supply hot gases to said by-pass channel, a fan in said chamber for actuating through said path the gases returned from said enclosure and the gases from said by-pass channel including the hot gases supplied thereto, and dampers for reversing the flow of gases through said enclosure.

In testimony whereof, I have hereunto subscribed my name this 24th day of October, 1928.

FRANZ PUENING.